US006644535B2

(12) United States Patent
Wallach et al.

(10) Patent No.: US 6,644,535 B2
(45) Date of Patent: Nov. 11, 2003

(54) TRUSS CORE SANDWICH PANELS AND METHODS FOR MAKING SAME

(75) Inventors: Jeremy C. Wallach, Boston, MA (US); Lorna J. Gibson, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/860,703

(22) Filed: May 18, 2001

(65) Prior Publication Data

US 2002/0170941 A1 Nov. 21, 2002

(51) Int. Cl.[7] .................. B21D 39/00; B23K 1/20; B23K 31/00; B32B 5/12; B32B 7/00
(52) U.S. Cl. .................. 228/173.5; 228/178; 228/157; 228/146; 228/173.4; 219/56; 219/153; 428/105; 428/119; 428/175
(58) Field of Search .................. 228/173.5, 157, 228/173.1, 178, 193, 146–148, 173.4; 428/119, 136, 98, 105, 175; 52/309.4, 309.9; 219/56, 153

(56) References Cited

U.S. PATENT DOCUMENTS

| | | | |
|---|---|---|---|
| 3,641,303 A | * 2/1972 | Collins | 219/56 |
| 3,969,563 A | * 7/1976 | Hollis, Sr. | 220/62.11 |
| 4,079,560 A | 3/1978 | Weismann | |
| 4,117,873 A | * 10/1978 | Crawford | 140/105 |
| 4,291,732 A | * 9/1981 | Artzer | 140/105 |
| 4,336,676 A | * 6/1982 | Artzer | 29/428 |
| 4,393,987 A | * 7/1983 | Anderson et al. | 228/157 |
| 4,395,615 A | * 7/1983 | Tanenbaum | 219/79 |
| 4,450,338 A | 5/1984 | Conn, Jr. | |
| 4,826,106 A | * 5/1989 | Anderson | 181/214 |
| 5,527,590 A | 6/1996 | Priluck | |
| 5,679,467 A | 10/1997 | Priluck | |
| 5,741,574 A | * 4/1998 | Boyce et al. | 428/112 |
| 5,962,150 A | 10/1999 | Priluck | |
| 6,203,654 B1 | * 3/2001 | McFall et al. | 156/201 |
| 6,205,728 B1 | * 3/2001 | Sutelan | 428/182 |
| 6,237,297 B1 | * 5/2001 | Paroly | 52/309.4 |
| 6,273,161 B1 | * 8/2001 | Yamagami et al. | 152/527 |

FOREIGN PATENT DOCUMENTS

JP 60-40635 A * 3/1985
JP 11-22090 A * 1/1999

OTHER PUBLICATIONS

Wallach, Jeremy C. "Mechanical Behavior of Truss Materials", pp. 47, 68, 83–90. Massachusetts Institute of Technology, Jun. 2000.

* cited by examiner

Primary Examiner—Tom Dunn
Assistant Examiner—L. Edmondson
(74) Attorney, Agent, or Firm—Richard L. Sampson, Esq.

(57) ABSTRACT

A structural material includes a plurality of discrete, interwoven wires disposed between and fastened to two solid face sheets. Each of the plurality of wires further includes at least two points of contact with each of the two face sheets. Methods for fabricating the aforementioned structural material include an automated methodology for fabricating a relatively inexpensive truss core sandwich panel.

32 Claims, 8 Drawing Sheets

TRUSS CORE SANDWICH PANELS AND METHODS FOR MAKING SAME

BACKGROUND OF THE INVENTION

(1) Field of the Invention

The present invention generally relates to sandwich structures having relatively high strength to weight ratios. More particularly this invention relates to sandwich structures having truss cores and methods for making the same.

(2) Background Information

Structures including solid sheet and/or plate members are ubiquitous, being found in automobiles, buildings, aircraft, industrial equipment, and a host of other applications. Sheet and plate materials are advantageously quite strong and relatively inexpensive. Disadvantageously they tend to be heavy, and therefore generally have a relatively low strength to weight ratio.

Sandwich structures are frequently used in applications and implementations where it is desirable for structures to have a relatively high strength to weight ratio and/or where weight reduction is a significant factor. One example application is as a structural material used in the aerospace industry. One common sandwich structure, typically referred to as a honeycomb structure, includes thin face sheet laminates and a honeycomb core. Honeycomb structures are generally characterized by having a significantly higher strength to weight ratio than sheet or plate materials, especially to bending and buckling loads. Disadvantageously, honeycomb structures tend to be limited to relatively thin face sheets. Further, honeycomb structures tend to be expensive and difficult to manufacture, with the manufacturing process typically including complicated bonding procedures for attaching the honeycomb core to the face sheets.

Another relatively common sandwich structure, referred to as a truss core sandwich panel, includes a corrugated sheet or a truss core disposed between two face sheets. Truss core sandwich panels are also generally characterized as having a significantly higher strength to weight ratio than solid sheet or plate materials, although generally not as high as that of honeycomb structures. Truss core sandwich panels tend to be advantageous for some applications since they may be fabricated with face sheets having a heavier gauge than those of honeycomb structures. However, truss core sandwich panels also tend to be expensive and difficult to manufacture, generally requiring batch type processing.

Priluck, in U.S. Pat. Nos. 5,527,590, 5,679,467, and 5,962,150 (hereafter referred to as the Priluck patents) discloses a structural material having a lattice configuration manufactured from a plurality of segments, which are typically welded together in order to fix their position. The lattice is generally configured in the shape of uniformly stacked pyramids in a three-dimensional array. Manufacturing of the structural materials disclosed in the Priluck patents, however, tends to be highly complex. Fabrication of the truss core alone generally requires multiple steps, including injection molding, manual assembly, investment casting, and/or welding. Attachment of solid face sheets generally adds additional manufacturing steps. As a result the material disclosed in the Priluck patents tends to be expensive. Further, the injection molding and investment casting processes limit the application to materials having relatively low melting temperatures.

Therefore there exists a need for improved sandwich structures and/or truss core sandwich panels and an improved method of manufacturing for reducing the difficulties associated therewith and for producing a relatively inexpensive material.

SUMMARY OF THE INVENTION

In one aspect, the present invention includes a structural material. The structural material includes two solid face sheets and a truss core, which includes a plurality of discrete, interwoven wires. The truss core is disposed between the face sheets and attached thereto. Each of the plurality of wires includes multiple points of contact with each of the two solid face sheets. In one variation of this aspect, the interwoven wires and faces sheets include metal and are spot-welded to one another.

In another aspect, this invention includes a method for fabricating a structural material. The method includes bending a plurality of wires, fastening the plurality of wires to a first face sheet, and fastening the plurality of wires to a second face sheet. In one variation of this aspect, the method further includes advancing the first face sheet and the second face sheet from a first roll and a second roll, respectively, the advancing being in a longitudinal direction, and advancing the plurality of wires in the longitudinal direction between the first face sheet and the second face sheet.

DETAILED DESCRIPTION

Figure 1:
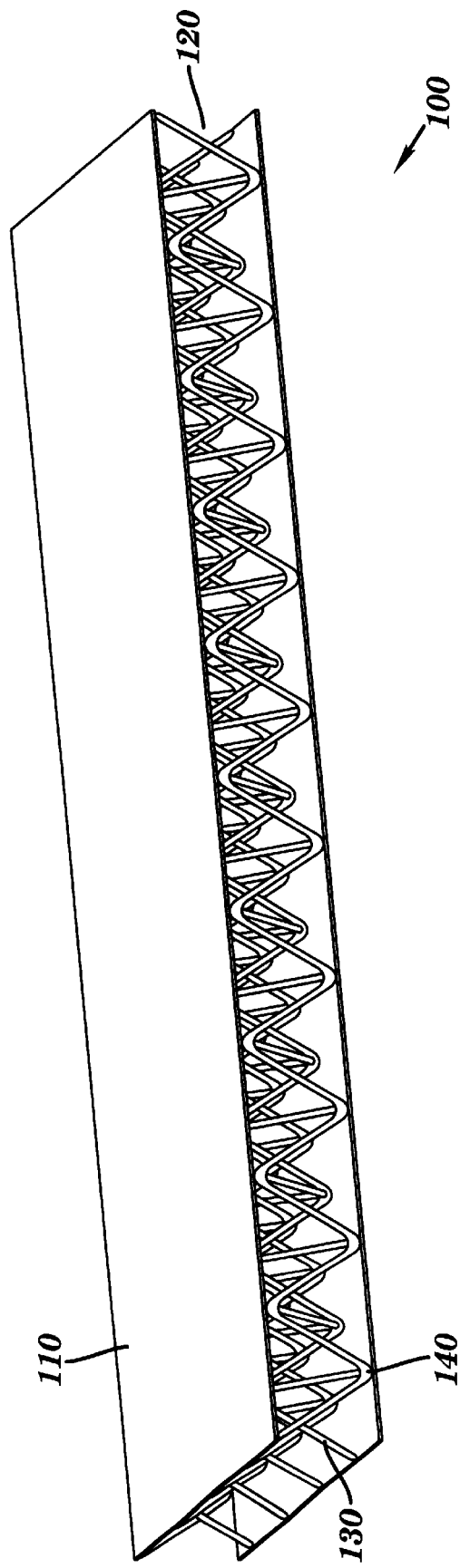
FIG. 1 is a schematic representation of one embodiment of the invented truss core sandwich panel.
Figure 2:
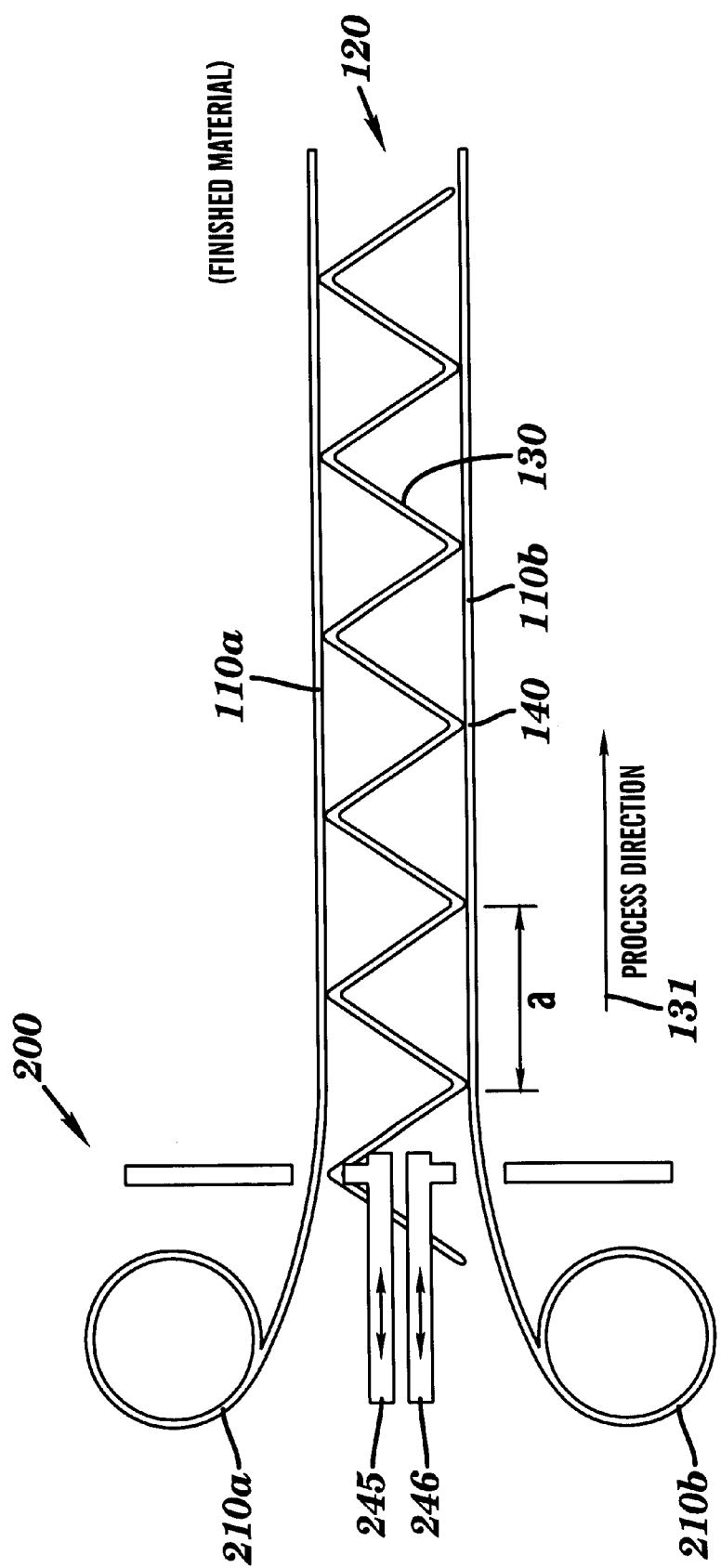
FIG. 2 is a schematic representation of an apparatus for fabrication of a truss core sandwich panel.

Referring to FIG. 1, a portion of a truss core sandwich panel 100 constructed according to the principles of this invention is illustrated. Typically, the sandwich panel 100 includes an interwoven truss core 120 disposed between two solid face sheets 110. In one embodiment, truss core 120 may include a network of interwoven metal wires 130 spot-welded to sheet metal face sheets 110. Sandwich panel 100 may be fabricated using a continuous processing methodology, as illustrated in FIG. 2, wherein solid face sheets 110a, 110b and wire 130 are continuously fed past a plurality of spot welding devices, which attach the wire 130 to the face sheets 110a, 110b. Pre-cut, pre-bent wire may further be inserted transversely to the direction of continuous feed.

Advantageously, panel 100 may be fabricated continuously rather than in a batch process, which may provide for increased throughput, substantially reduced costs, and longer panel lengths. The processing method of this invention is further advantageous in that it is relatively simple compared to the injection molding and investment casting approach of the prior art discussed hereinabove. Further still, the present invention may enable a truss core sandwich panel to be fabricated from materials having higher melting temperatures than those used in investment castings. Another advantageous feature of this invention is that fluid may flow relatively freely through the interior of the core, as opposed to conventional structures such as honeycomb structures or those including metal corrugations, which either do not provide for fluid flow or generally only permit fluid flow along one axial direction. These fluid flow characteristics may provide for advantageous heat transfer in some applications (e.g., for providing a heat sink in a manufacturing environment).

Figure 3A:
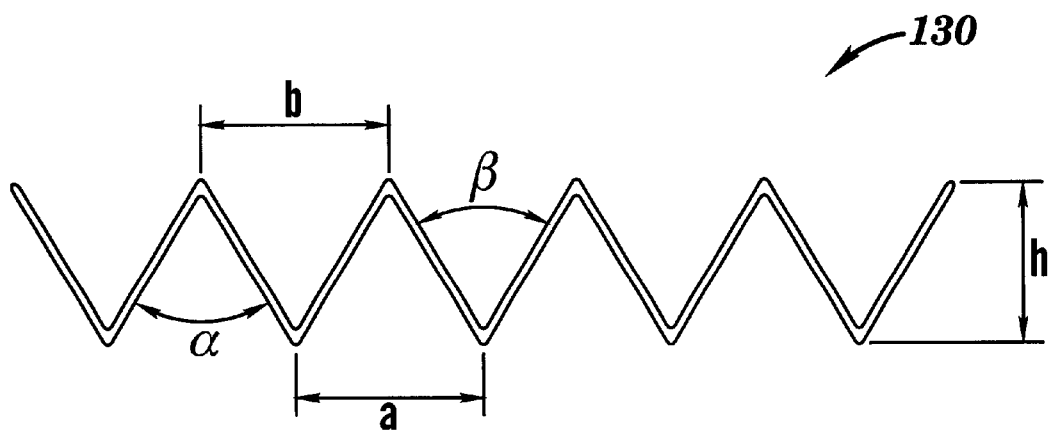
FIG. 3A is a schematic representation of a wire bend pattern that may be used in the fabrication of the truss core sandwich panel of this invention.
Figure 3B:
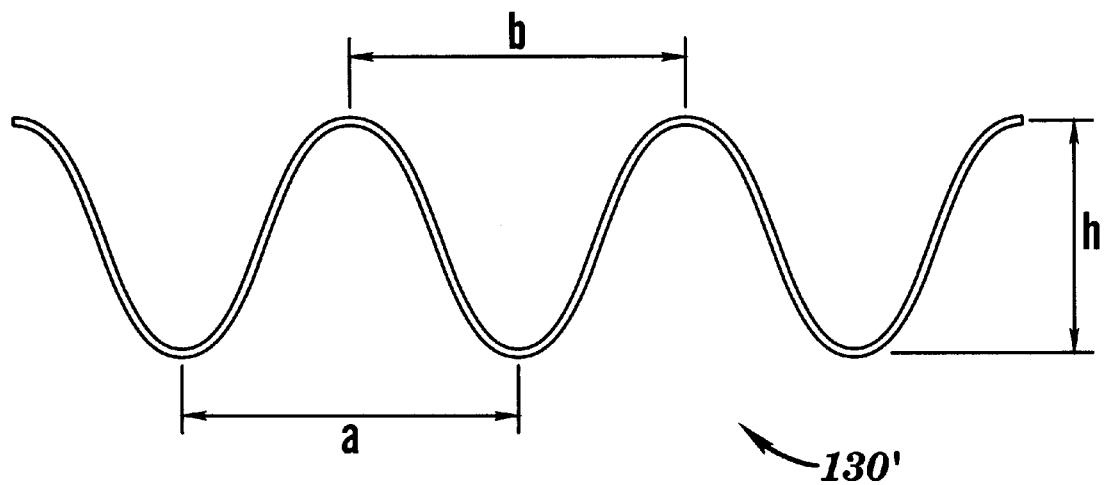
FIG. 3B is a schematic representation of another wire bend pattern.
Figure 4A:
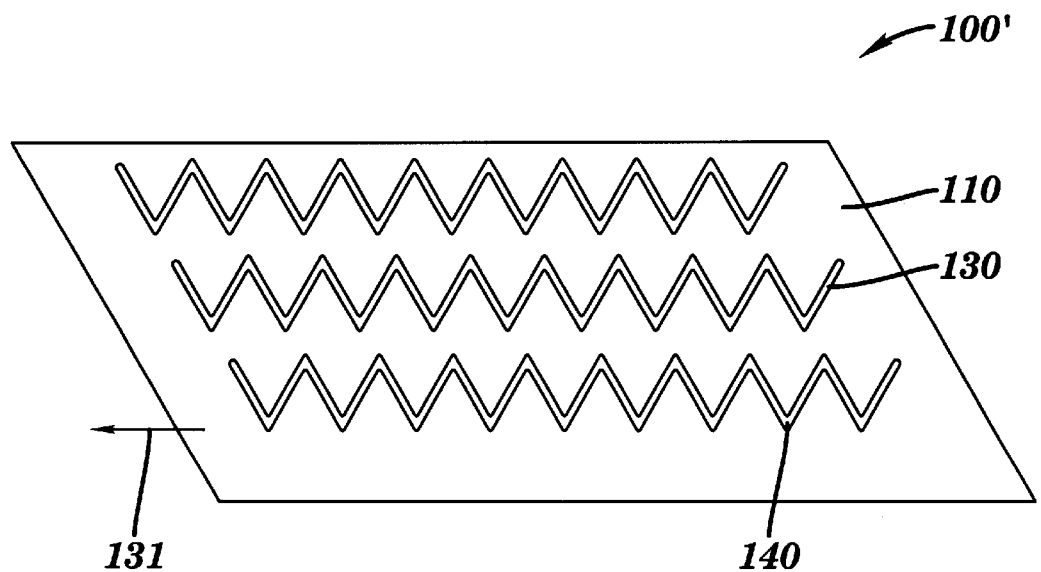
FIG. 4A is a schematic representation of one embodiment of the invented truss core sandwich panel shown with one face sheet cut away.
Figure 4B:
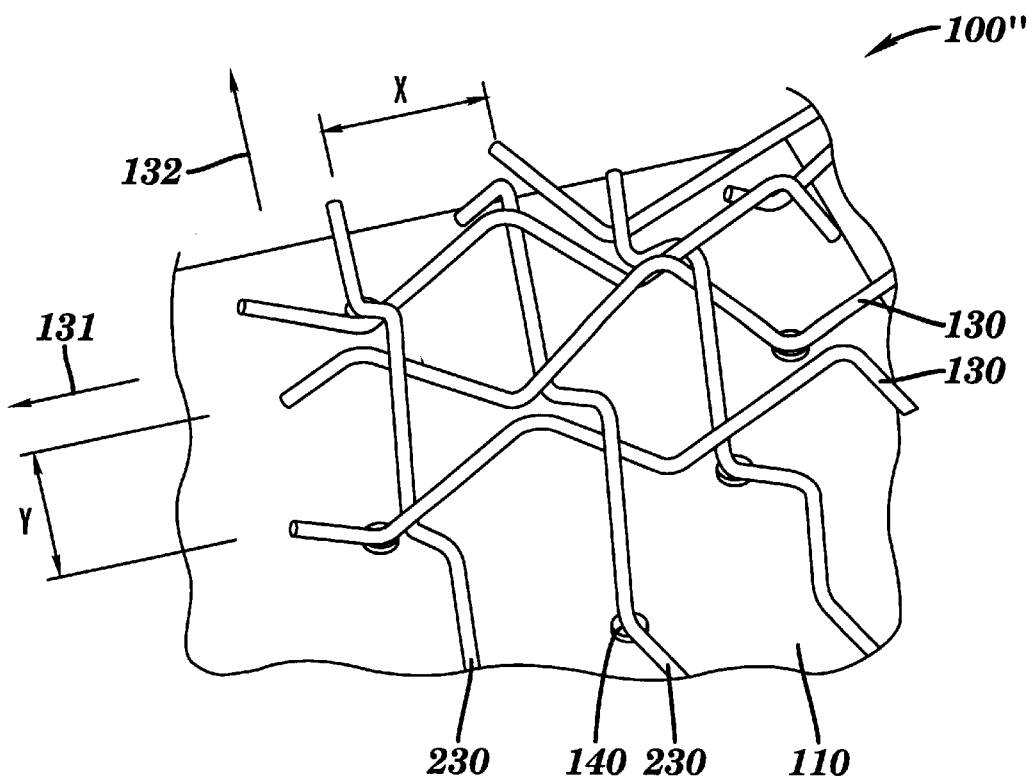
FIG. 4B is a schematic representation of another embodiment of the invented truss core sandwich panel shown with one face sheet cut away.

Referring now to the Figures in greater detail, as shown in FIG. 1, one embodiment of sandwich panel 100 includes two face sheets 110 and a truss core 120 constructed from interwoven wires 130. The wires 130 may be configured in any fashion suitable for making contact with the two face sheets 110, but are typically bent as shown in FIG. 3A or FIG. 3B. (FIG. 3A shows a wire 130 including a triangular (i.e. zigzag) bend pattern while FIG. 3B shows a wire 130' including a sinusoidal-like bend pattern.) The wires 130, 130' are typically woven to extend in either one, two, or multiple axial directions and are typically spot-welded to the face sheets 110 at the points of contact 140. As used herein the term "axial direction" and/or "axis" refers to a direction which is substantially parallel to the plane of the face sheets 110 of the truss core sandwich panel. The method of joining wires 130 to face sheets 110 is discussed in more detail hereinbelow. (FIG. 4A illustrates a sandwich panel 100' (shown with one face sheet removed) in which the wires 130 are woven (i.e., the wires extend) in one axial direction 131. FIG. 4B illustrates a sandwich panel 100" (also shown with one face sheet removed) in which the wires 130 are woven along two axial directions (axes) 131, 132.) Axial directions 131 and 132 are typically, but not necessarily, perpendicular to one another. Sandwich panels in which wires 130 are woven in one axial direction 131 (e.g., as shown in FIG. 4A) tend to have some degree of flexibility about that axis 131, while sandwich panels in which wires 130 are woven in two axial directions 131, 132 (e.g., as shown in FIG. 4B) tend to resist flexing about either axis 131 or 132.

Sandwich panel 100 is potentially advantageous in that its mechanical properties (e.g. strength, stiffness, strength to weight ratio, etc.) may be engineered by tailoring the geometry, thickness, and properties of the interwoven truss core 120 and the thickness and properties of the solid face sheets 110. For example, increasing the spacing between the wires (X and Y in FIG. 4B) tends to decrease the strength of panel 100 while also advantageously decreasing the weight. Decreasing the spacing between wires 130 tends to increase the strength of the panel 100, but also tends to increase the weight. The mechanical properties of sandwich panel 100 may be further engineered by controlling the bend shape of wire 130. For example, when using a wire 130 including a triangular bend pattern as shown in FIG. 3A, decreasing angles $\alpha$ and $\beta$ and height h tends to increase the panel strength in some directions while decreasing it in other directions. (Decreasing $\alpha$ and $\beta$ will tend to increase the weight, while decreasing h will tend to decrease the weight, all other things being constant). Typically the wires are bent to a configuration in which angles $\alpha$ and $\beta$ are in the range from about 45° to about 135°. In one configuration, a relatively high strength to weight ratio is achieved when dimensions a and b are approximate 1.5 h.

Sandwich panel 100 may be constructed of any suitable materials and may be metallic, nonmetallic or a combination thereof. A metallic sandwich panel may be constructed of substantially any metal and/or alloy including aluminum, chromium, copper, iron, magnesium, nickel, titanium, and combinations thereof. Desirable metals and alloys typically include iron alloys, such as stainless steels and plain carbon steels, aluminum alloys and copper alloys. In a metallic structure, wires 130 are typically spot-welded to face sheets 110 as described in more detail hereinbelow.

Sandwich panel 100 may also be constructed of nonmetallic materials such as polymers, polymer composites, plastics, and ceramics. For example, polymer (i.e., plastic) wires 130 may be bent as described herein, or molded, into a desired configuration (e.g., to form wires 130, 130' of FIGS. 3A and 3B). These polymer or plastic wires may then be bonded (e.g. by ultrasonic welding or diffusion bonding) to polymer or plastic face sheets 110. Similarly, other composite materials may be used, such as fiber composite wires impregnated with a resin, which may be heated and bonded to fiber composite sheets to form a fiber composite sandwich panel. The above described fiber composites may include carbon, glass and/or other fiber materials.

Figure 5:
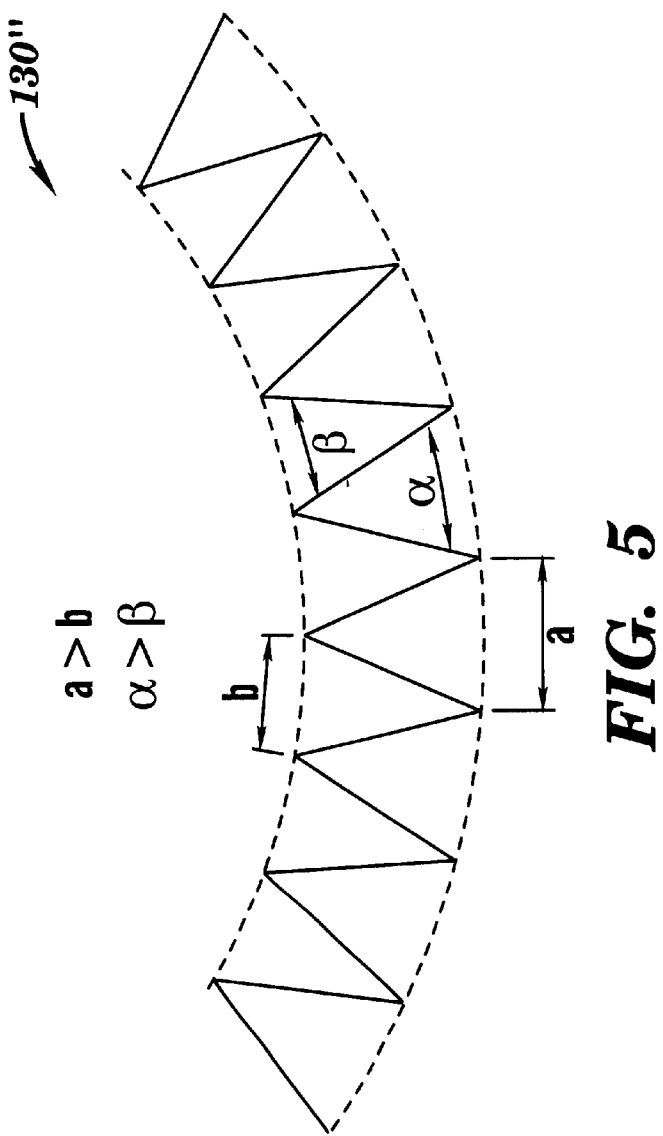
FIG. 5 is a schematic representation of a wire pattern used to construct a truss core sandwich panel having curved profile.

Sandwich panel 100 is typically planar (i.e., substantially flat as shown in FIG. 1) and includes a wire bend pattern similar to those shown in either FIG. 3A or FIG. 3B, in which a is approximately equal to b. However panel 100 may also be constructed to include a curved profile by systematically adjusting the size and degree of the bend applied to wires 130. For example, as shown in FIG. 5, a wire 130" including a bend pattern in which a is greater than b (i.e., in which $\alpha$ is greater than $\beta$) may be used in the fabrication of a panel having a curved profile. A wire including a bend pattern in which a is less than b (not shown) may also be used in the fabrication of a panel having a curved profile, with the orientation of the curvature being opposite that shown in FIG. 5. The example shown in FIG. 5 is merely exemplary. Artisans of ordinary skill may conceive of any number of wire bend patterns for producing panels having curvature. These are considered within the scope and spirit of this invention. Moreover, many embodiments of panels 100, particularly those fabricated from plastics or polymers, may be provided with various curvatures by subjecting the panels to heat and pressure, e.g., by placing the panels 100 in a heating mold.

Embodiments of the truss core sandwich panel of the present invention may be used in a wide variety of applications, especially for those in which a high strength to weight ratio is required. For example, candidate uses may include decks on military and/or commercial shipping vessels, as well as various aircraft, boating and other transportation applications. Further, the ability to manufacture truss core sandwich panels having relatively complex curvature may enable these materials to be used advantageously in applications such as boat hulls, aircraft wing and body skins, pressure vessels and containers, and the like. Further still, the fluid flow capabilities described hereinabove may provide for advantageous heat transfer and may enable these materials to be used in industrial applications, such as chemical processing, energy generation, and the like, in which heat sinks are required and/or beneficial. Additional applications include automobile construction. For example, flat panels may be used to fabricate frame and/or firewall components, while curved panels may be used for high strength/low weight body panels.

The truss core sandwich panel of this invention may be fabricated in any desired manner, such as by using various batch processing, continuous processing, manual, and/or automated methods. As used herein the term "continuous processing" shall refer to a fabrication method that may be characterized as having a substantially continuous flow (on a time or materials basis), in contrast to batch or intermittent processing. The term "automated" shall refer to a fabrication method in which at least a portion of the method includes computer or other electronic or electromechanical control. For example, one fabrication methodology may include bending a plurality of wires, fastening the wires to a first face sheet, and fastening the wires to a second face sheet. As mentioned hereinabove, the fastening may be by any known means, such as by spot welding, diffusion bonding, and the like. Another fabrication methodology may include bending a plurality of wires, disposing the bent wires between two face sheets and fastening the wires to the face sheets.

Figure 6:
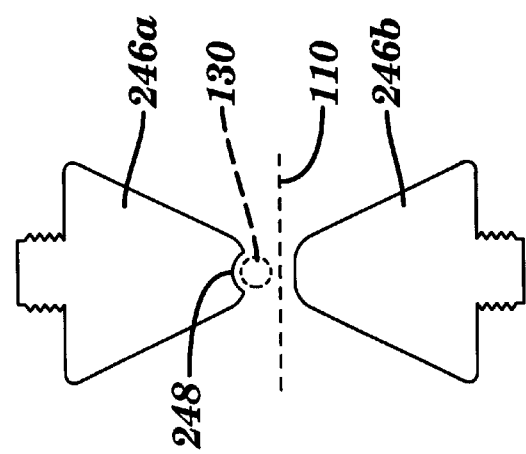
FIG. 6 is a schematic representation of example spot welding electrodes used in the apparatus shown in FIG. 2.

Referring again to FIG. 2, a cross-section of an apparatus 200 for use in a continuous fabricating method of the present invention is shown. Apparatus 200 receives sheet stock from two rolls of face sheet material 210a, 210b (e.g. sheet metal) and includes at least two spot welding devices 245, 246, one of which is used for joining wire 130 to one face sheet (e.g. face sheet 110a) and the other of which is used for joining wire 130 to the other face sheet (e.g. face sheet 110b). Spot welding devices 245, 246 are typically configured for sequential welding of the individual points of contact 140 (FIG. 1) between face sheets 110a, 110b and wire 130. However, spot welding devices having an array of electrodes for simultaneous welding of numerous points of contact 140 may also be utilized to achieve relatively higher speed processing. Spot welding electrodes of any type may be utilized. Exemplary spot welding electrodes 246a, 246b, including a notch 248 configured to receive wire 130, are shown in FIG. 6 (wire 130 and face sheet 110 are shown in phantom).

In operation, the face sheets 110a, 110b (e.g. sheet metal) are fed in a longitudinal direction (which as used herein, is parallel to axial direction 131 of FIGS. 4A and 4B) from two rolls 210a and 210b, while bent wire 130 is fed longitudinally therebetween. Pre-bent and pre-cut wires 230 (FIG. 4B) may also be inserted transversely relative to the longitudinal direction (i.e., along axial direction 132 of FIG. 4B). Face sheets 110a, 110b are joined to wire 130 at contact points 140, using spot welders 245, 246.

Figure 7:
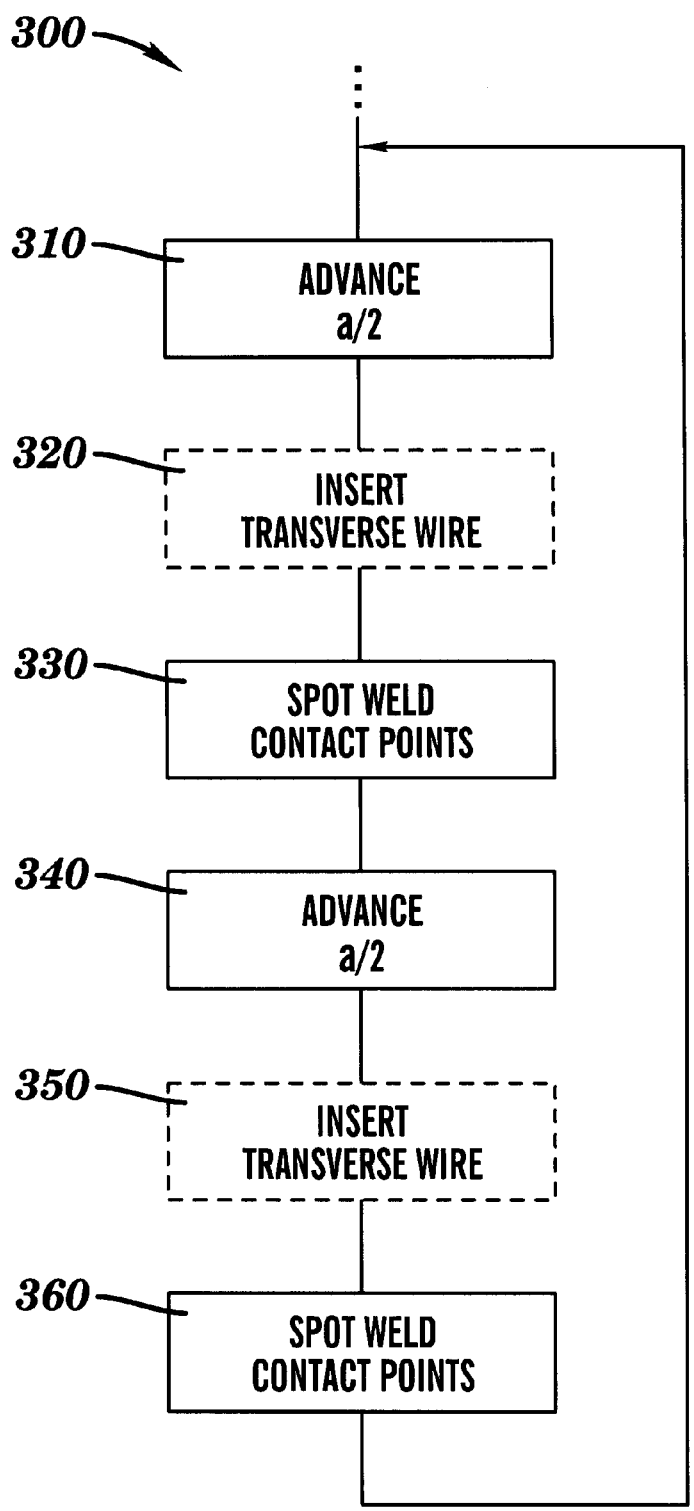
FIG. 7 is a flowchart of a portion of a method for fabricating a truss core sandwich panel.

A continuous processing fabrication method for manufacturing a metallic truss core sandwich panel 100 using apparatus 200 of FIG. 2 is now described with respect to flowchart 300 of FIG. 7. As shown, at 310, the face sheets 110a, 110b and bent wire 130 are advanced longitudinally a distance of α/2, (i.e., until the points of contact 140 of the wires 130 with sheet 110a are aligned with the welder 245 as shown in FIG. 2). Although FIG. 2 shows only one wire 120, as best shown in FIGS. 4A and 4B, a plurality of wires 120 may be used, with alternate wires 120 being out of phase by α/2. Accordingly, it should be evident to the skilled artisan that this fabrication method involves welding at both panels 110a and 110b upon each advance of distance α/2. At 320, a pre-bent, pre-cut wire 230 is optionally inserted transversely to the longitudinal direction (i.e., along axis 132 as shown in FIG. 4B). At 330, the longitudinal wires 130 and transverse wire 230 (if used) are spot-welded to face sheet 110a at the points of contact 140 by welder 245. The transverse wire 230 (if used) is also spot welded to the other face sheet 110b using welder 246. At 340, the face sheets 110a, 110b and longitudinal wires 130 are again advanced longitudinally a distance of α/2, to align contact points 140 with sheet 110b with welder 246 At 350, an other pre-bent, pre-cut wire 230 is optionally inserted transversely (i.e., in axial direction 132). At 360, longitudinal wires 130 and the other transverse wire 230 (if used) are spot-welded to face sheet 110b at the points of contact 140 by welder 246. This other transverse wire is also spot welded to face sheet 110a. This process is repeated through numerous cycles enabling a truss core sandwich panel of a wide range of sizes to be fabricated in a substantially continuous manner.

Figure 8:
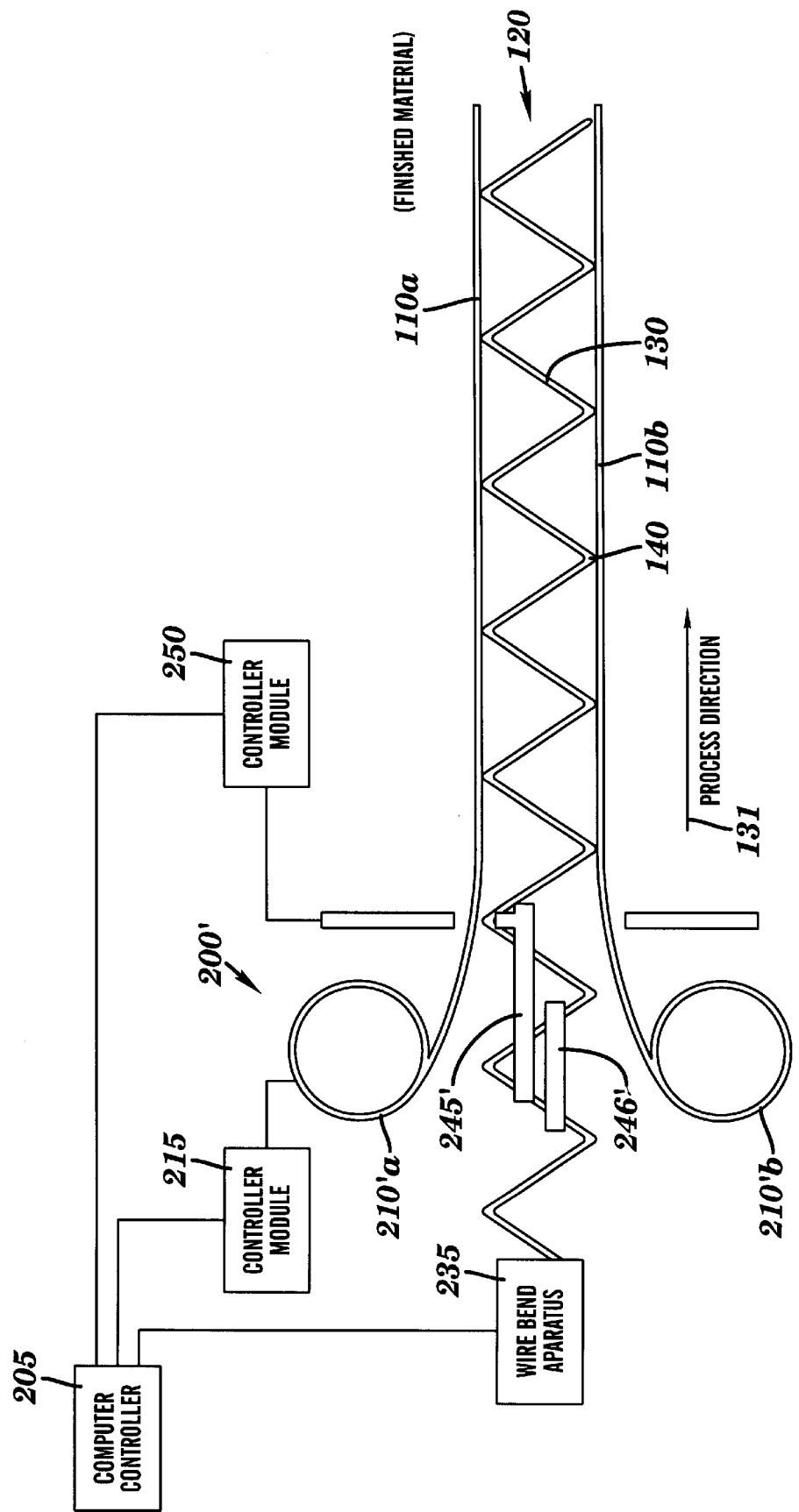
FIG. 8 is a schematic representation of an apparatus for semi-automated or fully automated fabrication of a truss core sandwich panel.

The continuous processing method described in FIGS. 2 and 7 may be performed manually or in an automated manner. Turning now to FIG. 8, an apparatus that provides for automated, continuous processing is illustrated. Apparatus 200' includes rolls of sheet material 210a, 210b and spot welding devices 245', 246' as described previously with respect to FIG. 2. Apparatus 200' further includes a computer controller 205, one or more computer controllable wire bending apparatuses 235, a controller module 215 for controlling the feed rate of rolls 210a, 210b, and a controller module 250 for controlling spot welding devices 245', 246'. Computer controller 205 may be any type of microprocessor-equipped device, including a device having an embedded processor, but may also include a general purpose computer such as a Wintel (including a microprocessor manufactured by Intel® Corporation, Santa Clara, Calif., and an operating system manufactured by Microsoft® Corporation, Redmond, Wash.), or a Macintosh® (Apple® Corporation, Cupertino, Calif.) PC. Controller module 215 typically includes a processor-actuatable motor or servo for controlling the rotation rate and timing of rollers 210a, 210b. Controller module 250 typically includes elements for controlling the relative position and operation of the spot welding devices 245', 246'. For example spot welding electrodes 245', 246' may be mounted on drive members (not shown) for controlling the displacement thereof. Thereby, a pair of electrodes may be moved transversely with respect to the process direction for automated sequential welding of the numerous points of contact 140. Control of the drive members may be coordinated with the advancement of the face sheets 110a, 110b and longitudinal wire 130 and with the insertion of the transverse wire (if used).

Figure 9:
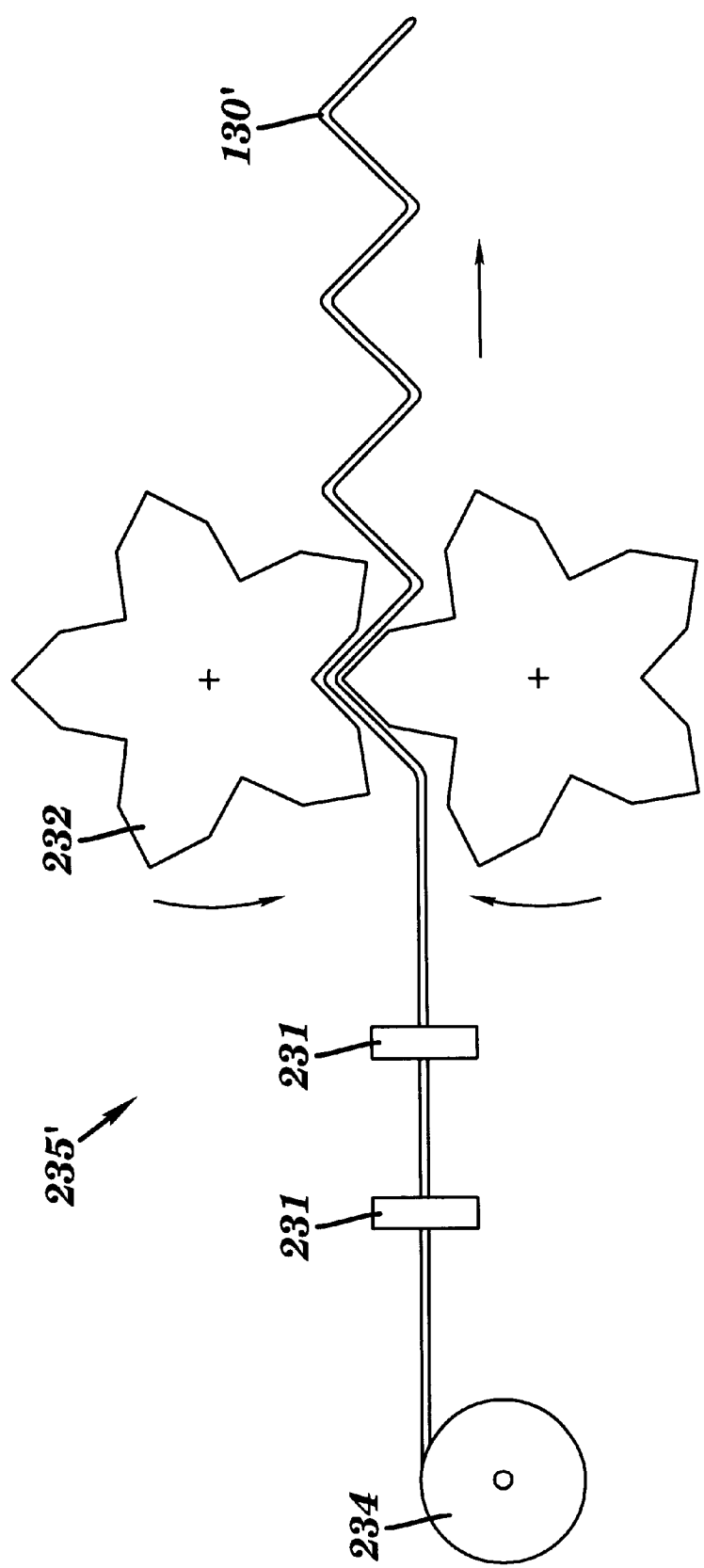
FIG. 9 is a schematic representation of an example wire-bending device used in the apparatus shown in FIG. 8.

Wire bending apparatuses 235 may be any that provide for controllably bending wire into a predetermined pattern (e.g., those shown in FIGS. 2A and 2B). One example of a wire bending apparatus is shown in FIG. 9. As shown, wire bending apparatus 235' includes two gear-like wheels 232 (i.e., having teeth that substantially intermesh with one another) to produce a wire 130' having a generally triangular bend pattern. Gear-like wheels 232 are rotated in the directions shown, which draws the wire 130' through the apparatus, between the teeth of the intermeshed wheels 232, to produce the bends as shown. The wire 130' is typically fed from straight stock or a spool 234 and fed through one or more tabs 231, which function to straighten it prior to the controlled bending operation. Wire bending apparatus 235' may be manually driven by means of a hand-crank (not shown). However, it is generally desirable for the gear-like wheels 232 to be driven by means of an electric motor or a servo-motor to provide for relatively precise control of the wire feed rates and to provide for compatibility with automated processing.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A method for fabricating a truss core sandwich panel, said method comprising:

advancing a plurality of wires into mutual engagement with at least two meshed gears of a wire bending machine;

bending the plurality of wires using the wire bending machine, into a repeating oscillatory pattern;

fastening the plurality of wires to a first face sheet; and fastening the plurality of wires to a second face sheet;

wherein the plurality of wires are disposed between said first and said second face sheet.

2. The method of claim 1 further comprising:

advancing said first face sheet and said second face sheet in a longitudinal direction; and advancing said plurality of wires in said longitudinal direction between said first face sheet and said second face sheet.

3. The method of claim 2 wherein said advancing comprises advancing said first face sheet from a first roll and advancing said second face sheet from a second roll.

4. The method of claim 2 further comprising inserting a wire transversely to the longitudinal direction.

5. The method of claim 4 wherein said wire is pre-cut and pre-bent.

6. The method of claim 2 wherein said advancing said first face sheet and said second face sheet and said advancing said plurality of wires are effected by a processor.

7. The method of claim 6 wherein said bending a plurality of wires is effected by a processor.

8. The method of claim 1 wherein said fastening comprises spot welding.

9. The method of claim 8 wherein said spot welding is performed by a spot welding device comprising spot welding electrodes operably coupled to drive members for controlling the location of said spot welding electrodes.

10. The method of claim 8 wherein said spot welding is controlled by a processor.

11. A truss core sandwich panel fabricated by the method of claim 1.

12. A truss core sandwich panel fabricated by the method of claim 2.

13. The structural material of claim 11 being substantially planar.

14. The structural material of claim 11 including a curved profile.

15. The structural material of claim 11 wherein said truss core and said face sheets comprise a polymer material.

16. The structural material of claim 11 wherein said truss core and said face sheets comprise a fiber composite material.

17. The structural material of claim 11 wherein said truss core and said face sheets comprise metal.

18. The structural material of claim 17 wherein said metal is a m ember of the group consisting of aluminum, chromium, copper, iron, magnesium, nickel, and titanium.

19. The structural material of claim 18 wherein said metal is a member of the group consisting of iron, aluminum, and copper.

20. The structural material of claim 17 wherein said interwoven wires are spot-welded to said face sheets.

21. The structural material of claim 11 wherein said interwoven wires are bent in a substantially triangular pattern.

22. The structural material of said claim 11 wherein said interwoven wires are bent in a substantially sinusoidal pattern.

23. The structural material of claim 11 wherein said wires are woven in one axial direction.

24. The structural material of claim 11 wherein said are woven in two axial directions.

25. The structural material of claim 11 wherein said are woven in three or more axial directions.

26. The structural material of claim 11 wherein said structural material is fabricated in a continuous process.

27. The structural material of claim 11, wherein each of said wires includes plurality of bends, each bend having an angle in the range from about 45 to about 135 degrees.

28. A method for fabricating a truss core sandwich panel, said method comprising:

(a) automatically advancing a plurality of wires into a wire bending machine;

(b) continuously bending the wires into a repeating oscillatory pattern during said automatically advancing (a);

(c) automatically advancing a first face sheet in superposition with the bent wires;

(d) automatically advancing a second face sheet in superposition with the bent wires and with the first face sheet, wherein the bent wires are disposed between the first and second face sheets;

(e) automatically fastening said plurality of wires to a first face sheet; and (f) automatically fastening said plurality of wires to a second face sheet;

wherein said method is effected as a continuous process.

29. The method of claim 28 wherein said continuously advancing (a) comprises advancing the wires into mutual engagement with at least two meshed gears.

30. The method of claim 28 wherein said automatically advancing (a), (c), and (d) each comprise advancing stock from a roll.

31. The method of claim 28, wherein the automatically fastening (e) and (f) each comprise engaging the wire and face sheet with opposed welder electrodes.

32. The method of claim 1 further comprising inserting said plurality of wires between said first and said second face sheet.

* * * * *